United States Patent [19]

Young, Jr.

[11] 3,728,531

[45] Apr. 17, 1973

[54] BINARY ARITHMETIC USING ANALOG COMPARATORS

[75] Inventor: J. Beverly Young, Jr., Carlisle, Mass.

[73] Assignee: Honeywell Information Systems, Inc., Waltham, Mass.

[22] Filed: July 16, 1971

[21] Appl. No.: 163,225

[52] U.S. Cl. ....................235/175, 235/168, 235/172

[51] Int. Cl..............................G06f 7/50, G06f 7/385

[58] Field of Search.......................235/175, 172, 173, 235/168

[56] References Cited

UNITED STATES PATENTS

| | | | |
|---|---|---|---|
| 3,586,845 | 6/1971 | Komamiya et al. | 235/175 X |
| 2,671,607 | 3/1954 | Williams et al. | 235/172 |
| 3,609,329 | 9/1971 | Martin | 235/172 X |
| 3,534,404 | 10/1970 | Hanson | 235/173 X |

*Primary Examiner*—Malcolm A. Morrison
*Assistant Examiner*—James F. Gottman
*Attorney*—Ronald T. Reiling et al.

[57] ABSTRACT

A binary adder for performing binary arithmetic utilizing operational amplifiers and differential comparators. An operational amplifier provides an analog signal from logic level inputs representative of binary ones or zeroes. Differential comparators compare the analog voltage to reference voltages and provide output logic levels dependent on the result of the comparison. A single bit sum is defined as being "one" when there are an odd number of logic "ones" at the input. Carry-out is defined as being "one" whenever any two or more inputs are logic "ones."

8 Claims, 3 Drawing Figures

| A | B | Ci | S | Co |
|---|---|---|---|---|
| 0 | 0 | 1 | 1 | 0 |
| 0 | 1 | 1 | 0 | 1 |
| 1 | 0 | 1 | 0 | 1 |
| 1 | 1 | 1 | 1 | 1 |
| 0 | 0 | 0 | 0 | 0 |
| 0 | 1 | 0 | 1 | 0 |
| 1 | 0 | 0 | 1 | 0 |
| 1 | 1 | 0 | 0 | 1 |

INVENTOR.
J. BEVERLY YOUNG, JR.
BY Nicholas Prasinos
ATTORNEY

INVENTOR.
J. BEVERLY YOUNG, JR.
BY Nicholas Prasinos
ATTORNEY

BINARY ARITHMETIC USING ANALOG COMPARATORS

BACKGROUND OF THE INVENTION

It is well known that an adder is a most important building block of a digital computer. The main function of an adder is to add a number (addend) to another number (augend) and produce still another number (sum) and, depending on the value of the augend and the addend to produce a further number the (carry).

One technique for adding numbers is to add counts to the augend and subtract counts from the addend. When the addend equals zero the augend will then be the sum of the original augend and the addend, i.e., the sum of the two numbers which were originally designated to be added one to the other.

However, it is preferable to add (or subtract) digits of corresponding orders separately and adjust the results of each individual order of digit sums (or subtractions) in accordance with prescribed rules of carrying or borrowing to or from other orders of digit sums.

Accordingly the rules of binary addition (adding numbers having a radix of two) may be expressed by the following truth tables:

TABLE I

| | | | | |
|---|---|---|---|---|
| Augend Digit | 0 | 1 | 0 | 1 |
| Addend Digit | 0 | 0 | 1 | 1 |
| Sum Digit | 0 | 1 | 1 | 0 |
| Carry | 0 | 0 | 0 | 1 |

TABLE II

| | | | | | | | | |
|---|---|---|---|---|---|---|---|---|
| Augend Digit | 0 | 1 | 0 | 0 | 1 | 1 | 0 | 1 |
| Addend Digit | 0 | 0 | 1 | 0 | 1 | 0 | 1 | 1 |
| Carry-In | 0 | 0 | 0 | 1 | 0 | 1 | 1 | 1 |
| Sum-Digit | 0 | 1 | 1 | 1 | 0 | 0 | 0 | 1 |
| Carry-out | 0 | 0 | 0 | 0 | 1 | 1 | 1 | 1 |

Table 1 represents the truth table for a "half-adder" where Table II represents the truth table of a "full adder." A "half-adder" is a device which can form a representation of the sum of two numbers augend and addend represented by signals applied to its input terminals. The term "half-adder" has been used to denote a device wherein two digits are generally added. The reason that the term "half-adder" is used is that there still remains the task of adding the carry digit from one order to the sum of the next higher order. In order to perform this task two "half-adders" are utilized giving a "full-adder" whose truth table is shown in Table II. A full-adder is a unit that can form a representation of the sum of three numbers augend, addend and a previous carry, represented by signals applied to its input terminals. A device which utilizes two half-adders to add three digits in two separate steps is generally known as a two-input adder; whereas a device which adds three digits simultaneously is known as a three input adder, and has two outputs — a sum and a carry. Referring to Tables I and II a presence of "one" in the carry row indicates that a "one" must be added to the next most significant order.

The arithmetic operations thus far mentioned may be performed by devices falling in two general classes — namely serial or parallel machines. They differ according to the manner in which the numbers are transmitted to the adder. In the parallel adder technique all of the digits are transmitted simultaneously over separate channel wires, i.e., one channel for each digit. In the serial adder technique the digits are transmitted one at a time over one channel wire.

These general classes of adders may be further subdivided in accordance to the general type of circuit utilized. Although scores of circuits for electronic adders are known these circuits may be divided into four broad classes as follows:

a. Kirchoff adders — which add some physical quantity such as current or voltage. Typical adders of this type are described on pages 96 – 98 of "Arithmetic Operations In Digital Computers" by R.K. Richards. They may or may not utilize operational amplifiers.

b. Logical adders — which utilize logical circuits such as AND, NAND, OR or NOR gates. In this system Boolean expressions for a full adder such as the following are implemented by logic circuitry.

$$S = A\overline{B}\overline{C} + \overline{A}B\overline{C} + \overline{A}\overline{B}C + ABC \quad (1)$$

$$C_o = AB\overline{C} + A\overline{B}C + \overline{A}BC + ABC \quad (2)$$

Where

*A* equals Augend

*B* equals Addend

*C* equals previous Carry

*S* equals Sum, and $C_o$ equals Carry.

These equations for a full adder are derived from the truth table of a full adder by taking all possible combinations of Augend, Addend and previous carry in determining whether a sum or carry output is formed. The above equations can be reduced to simpler statements using Boolean Algebra, and these statements can be implemented by logic switching circuits i.e. AND, OR NOR circuits. This type circuit is also known as coincident type. A typical prior art circuit of this type is found in a U.S. Pat. to R.L. Gray, No. 2,892,099.

c. Pulse counting or non-coincidence adders — which utilize registers comprised of binary storage units such as flip-flops for adding a word contained in one register, to a word stored in another register, and storing the sum in still a third register. An adder typical of this type is to be found in U.S. Pat. to C.M. Hill, No. 2,715,997.

d. Diode matrix adders — which employ a diode switching or comparator matrix. Adders of this type are shown and described on pages 322 – 323 in "Digital Computer Design Fundamentals" by Yaohan Chu.

More recently, threshold logic has made its appearance. (See the Institute of Electrical and Electronics Engineers, Spectrum, May 1971, pages 32 – 39.) A threshold logic type gate for example is like any other logic gate in that it has binary inputs and outputs; however, the inputs may be weighted and a binary decision may be made in accordance to the results of a comparison made between the total weight and sum reference voltage. Greater logic power is provided by threshold logic because more information is provided as to the states of the inputs. Such logic may be utilized in the design of a unique adder combining known principles and techniques, hereinabove discussed, with basic concepts different than those heretofore discussed, to obtain binary adders having superior properties than those of known types. For example, because of the flexibility in choosing threshold voltages, gains, etc., noise margins and temperature stability is better, allowing wider component tolerances at lower costs. Furthermore because comparators comprise essentially the basic circuit power consumption is more stable than transistor transistor logic (TTL) now commonly in use.

SUMMARY OF THE INVENTION

A binary adder for performing binary arithmetic has an operational amplifier which provides a weighted analog voltage signal $V_S$ representative of the state of each voltage logic level input. The logic level inputs are each of equal amplitude $V_L$, when present, and correspond to the bits of binary numbers representing the Augend, Addend and Carry from the next less significant bit. Three differential comparators compare the weighted output analog voltage signal $V_S$ with three reference voltages. A reference voltage level $V_R$, somewhere between a zero level and $V_L$, is applied as an input to one comparator; another reference voltage level $2V_R$, somewhere between $V_L$ and $2V_L$ is applied as an input to another comparator; and still another reference voltage level $3V_R$, somewhere between $2V_L$ and $3V_L$ is applied as an input to still a third comparator. The weighted analog voltage signal $V_S$ is applied to another input terminal of each comparator. $V_S$ is compared to $V_R$ by the first comparator, to $2V_R$ by the second comparator, and to $3V_R$ by the third comparator. The output of the first comparator is high if $V_S$ is greater than $V_R$; the output of the second comparator is high if $V_S$ is greater than $2V_R$; and the third comparator is high if $V_S$ is greater than $3V_R$. The single-bit sum is defined as being "one" if there are an odd number of "ones" at the input. This is equivalent to $2V_R$ greater $V_S$ or $V_S$ greater than $3V_R$. The carry-out is defined as being "one" whenever two or more inputs are "one." This is equivalent to $3V_R$ being greater than $V_S$ being greater than $2V_R$.

OBJECTS

It is an object, therefore, of the instant invention to provide an improved binary adder.

It is another object of the invention to provide an adder for performing binary arithmetic utilizing analog comparators.

It is a further object of the invention to provide a binary adder utilizing threshold logic.

It is still a further object of the invention to provide a three input adder by combining analog and digital techniques.

Other objects and advantages of the invention will become apparent from the following description of a preferred embodiment of the invention when read in conjunction with the drawings contained herewith.

DESCRIPTION OF A PREFERRED EMBODIMENT

Figures 1, 2:
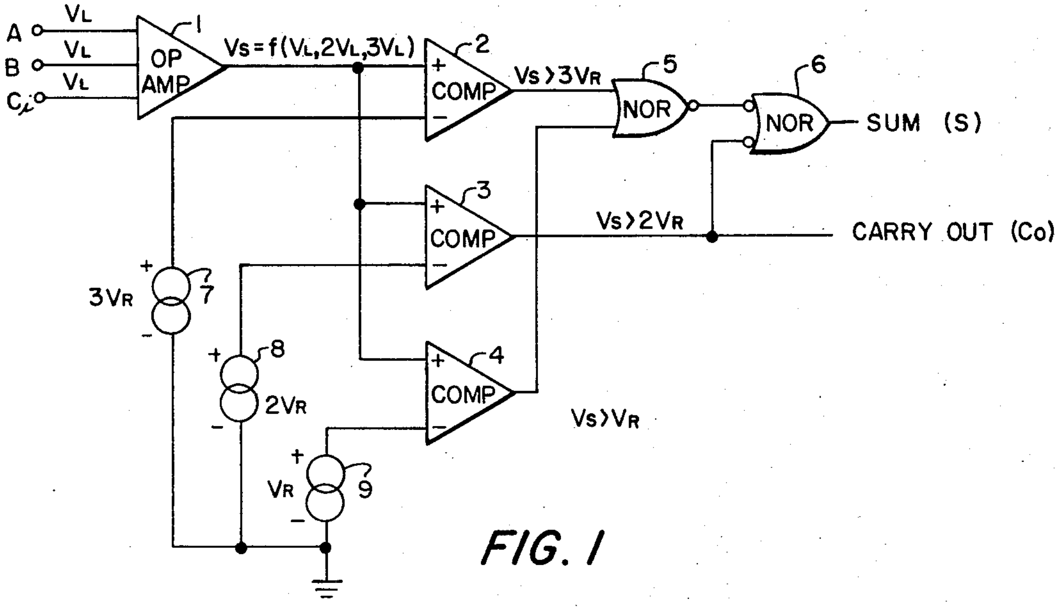
FIG. 1 is an overall logic block diagram of an embodiment of the invention.
FIG. 2 is a truth table of the invention.

Referring to FIG. 1, an operational amplifier (one typical operational amplifier is described in copending application Ser. No. 52,035 of William F. Acker for a "Complex Envelope Detector" assigned to the same assignee as the instant invention) has three input terminals A, B, $C_i$, for coincidently receiving voltage pulse signals $V_L$ indicative of a "one" bit representation. The output terminal of operational amplifier 1 is coupled to the plus terminal of comparators 2, 3, and 4 respectively. Constant voltage supplies 7, 8, and 9 each have their plus terminal coupled to the minus terminal of comparators 2, 3, and 4 respectively. The minus terminal of constant voltage supplies 7, 8, and 9 respectively is coupled to ground. The output terminal of each of comparators 2 and 4 is coupled to the input of NOR gate 5 whereas the output terminal of comparator 3 is coupled to an input terminal of NOR gate 6 and to a "-Carry-Out" line. The output terminal of NOR gate 5 is coupled to another input terminal of NOR gate 6; and the output terminal of NOR gate 6 is coupled to a sum line 5.

In operation, the operational amplifier 1 coincidently receives at its input terminals A, B, and $C_i$ voltage pulse signals indicative of bit representations that are to be added. The A terminal receives coded bit representations of the Augend; the B terminal receives coded bit representations of the Addend; and the $C_i$ terminal receives representations of a Carry from a previous lower order. These bit representations when present are received coincidently order by order and are added by the operational amplifier 1 to produce a weighted output voltage signal $V_S$ which is a function of $V_L$, $2V_L$, or $3V_L$, depending on the number of $V_L$ signals present at the inputs. Hence, if a $V_L$ signal is present at each of the inputs A, B, and $C_i$, then the output $V_S$ will be equal to $3V_L$. The weighted output $V_S$ is applied to one each input terminal of comparators 2, 3, and 4. Constant voltage supply 7 supplies a constant voltage $3V_R$ to comparator 2 for use as a reference voltage in comparing $V_S$ to $3V_R$. $3V_R$ is adjusted to have a magnitude somewhere between $2V_L$ and $3V_L$. In like manner constant voltage supply 8 supplies a reference voltage $2V_R$ to comparator 3 wherein the reference voltage $2V_R$ is adjusted so that it is maintained somewhere between $2V_L$ and $1V_L$. Finally constant voltage supply 9 supplies a constant voltage $V_R$ to comparator 4 and the magnitude of $V_R$ is adjusted to fall somewhere between $V_L$ and 0. Each of the comparators 2, 3, and 4 compare the weighted voltage signal $V_S$ to the reference voltage supplied to it. If the output voltage $V_S$ from operational amplifier 1 is greater than the reference voltage $3V_R$ then comparator 2 will output a high signal; if the output voltage $V_S$ from operational amplifier 1 is greater than the reference voltage $2V_R$ but less than the reference $3V_R$ then comparator 3 will be high but comparator 2 will be low; if the output voltage from operational amplifier $1V_S$ is greater than the reference voltage $V_R$ but less than the reference voltage $2V_R$ then comparator 4 will be high but comparators 2 and 3 will be low. Since the outputs of comparators 2 and 4 are applied to NOR gate 5 its output will be at logical zero (i.e., low) when either one or both of the outputs of comparators 2 and 4 is high; two low outputs from components 2 and 4 will produce a logical one (i.e., high) at the output of NOR gate 5. Similarly a high output from comparator 3 applied to an input of NOR gate 6 will produce a low output at NOR gate 6; also a high output from NOR gate 5 will produce a low output at NOR gate 6. Furthermore a high output from comparator 3 will produce a high signal or Carry-Out line (A typical NOR gate is the SN7402 commercially available from Texas Instrument Co. although other types of NOR gates may be used.)

Referring now to FIG. 2 which shows the truth table of the invention it will be noted that columns A, B, and $C_i$, represent the inputs to the Augend, Addend, and Carry from a previous low order digit sum respectively, whereas S is the sum and $C_0$ is the Carry-Out. By studying the truth table of FIG. 2 it will be noted that the sum S from the output of NOR gate 6 will be "one" or high when there are an odd number of "ones" at input terminal A, B, $C_i$, or in other words an odd number of these terminals are high. Also it will be further observed that the sum S will be "zero" or low when there are an even number of "ones" at the input terminals A, B, and $C_i$; or in other words when an even number of these input terminals are high. Moreover the Carry-Out will be high when any two or more inputs are high.

Figure 3:
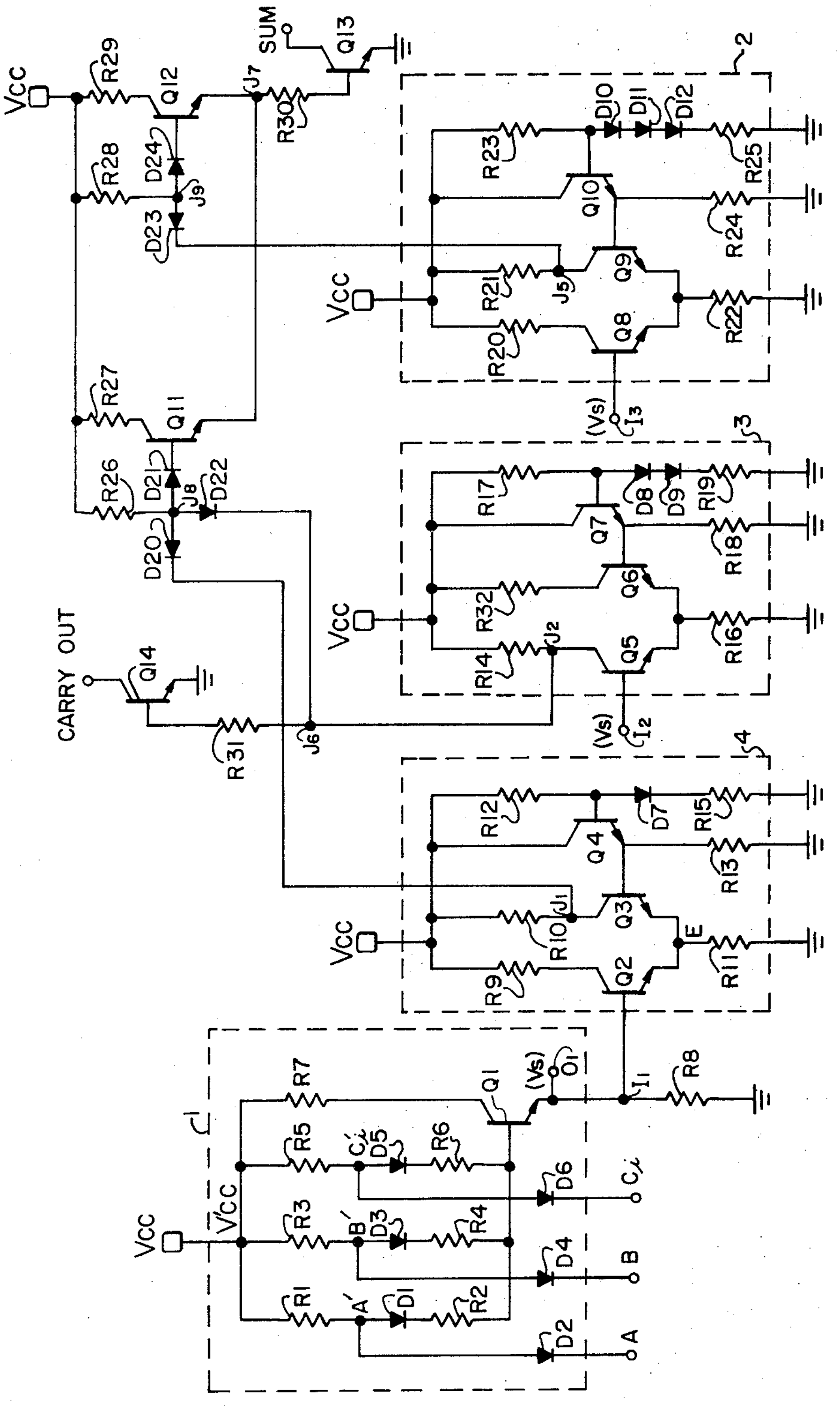
FIG. 3 is a schematic diagram of an embodiment of the invention.

Referring now to FIG. 3, a summing network 1 has a linear summing amplifier comprised of a transistor $Q_1$ whose base is parallel coupled to one terminal each of resistors $R_2$, $R_4$, and $R_6$ respectively; the collector of transistor $Q_1$ is parallel coupled to one terminal of each of resistors $R_1$, $R_3$, and $R_5$, through resistor $R_7$. The collector of transistor $Q_1$ is also coupled to Vcc supply through resistor $R_7$. The other terminals respectively of resistors $R_2$, $R_4$, and $R_6$ are coupled to a respective one of the cathodes of diodes $D_1$, $D_3$, and $D_5$; the respective anodes of diodes $D_1$, $D_3$, and $D_5$ are coupled to respective ones of the terminals of resistors $R_1$, $R_3$, and $R_5$. Input terminals A, B, and $C_i$, are coupled to junctions A', B', and $C'_i$ through diodes D2, D4, and D6 respectively. A bias terminal Vcc is coupled to the summing network at junction V'cc. The emitter of NPN transistor $Q_1$ is coupled to an output terminal $O_1$ which outputs a weighted signal $V_S$; the emitter of NPN transistor $Q_1$ is also coupled to junction $I_1$, and to ground through resistor $R_8$.

Differential comparator networks 2, 3, and 4 are essentially identical in structure, the main difference being that a reference voltage $V_R$ is supplied to transistor $Q_3$ of comparator 4, whereas a reference voltage $2V_R$ is supplied to transistor $Q_6$ of comparator 3, and a reference voltage $3V_R$ is supplied to transistor $Q_9$ of comparator 2. These voltages are adjusted by selecting the proper value of resistors $R_{12}$, $R_{15}$, $R_{17}$, $R_{19}$, $R_{23}$, and $R_{25}$. A description therefore of one of the comparators will suffice to explain the structure of the other comparators. More specifically therefore comparator 4 is comprised of NPN transistors $Q_2$ and $Q_3$; the collectors of transistors $Q_2$ and $Q_3$ are parallel coupled to each other through resistors $R_9$ and $R_{10}$ respectively. The emitters of transistors $Q_2$ and $Q_3$ are coupled to each other which are then coupled to ground through resistor $R_{11}$. Transistor $Q_4$ has bias circuit elements whose values are so chosen as to apply a reference voltage $V_R$ to transistor $Q_3$ of differential comparator 4. Similarly transistor $Q_7$ has bias circuit elements similar to those of transistor $Q_4$ but whose values are so chosen to apply a constant voltage $2V_R$ to transistor $Q_6$; and similarly transistor $Q_{10}$ of differential comparator 2 applies a reference voltage $3V_R$ to transistor $Q_9$.

Referring once again to comparator 4, the collector of transistor $Q_4$ is coupled to its base through series resistor $R_{12}$, and is also coupled to Vcc through series resistor $R_{12}$. The emitter of transistor $Q_4$ is coupled to the base of transistor $Q_3$ and is also coupled to ground through resistor $R_{13}$. The base of transistor $Q_4$ is series coupled to ground through diode $D_7$ and resistor $R_{15}$. (It will be noted as another difference between comparators 2, 3 and 4 that the base of transistor $Q_7$ of comparator 3 is series coupled to ground through diodes $D_8$ and $D_9$ and resistor $R_{19}$, whereas the base of transistor $Q_{10}$ of comparator 2 is series coupled to ground through diodes $D_{10}$, $D_{11}$, and $D_{12}$, and also through resistor $R_{25}$.)

Transistor $Q_{14}$ has its base coupled to junctions $J_2$ and $J_6$ through series resistor $R_{31}$; its emitter is coupled to ground whereas its collector is coupled to a carry-out terminal. Transistor $Q_{11}$ has its base coupled to junctions $J_6$ and $J_2$ through back-to-back coupled diodes $D_{21}$ and $D_{22}$; furthermore the base of transistor $Q_{11}$ is also coupled to junction $J_1$ through back-to-back coupled diodes $D_{21}$ and $D_{20}$. Junction $J_8$ which is coupled to the anodes of diodes $D_{20}$, $D_{21}$, and $D_{22}$ is coupled to Vcc through resistor $R_{26}$. The collector of transistor $Q_{11}$ is coupled to Vcc through resistor $R_{27}$, whereas its emitter is coupled to the emitter of transistor $Q_{12}$ via junction $J_7$ and is further coupled to the base of transistor $Q_{13}$ through series resistor $R_{30}$. Transistor $Q_{12}$ has its base coupled to junction $J_5$ through back-to-back couple diodes $D_{23}$ and $D_{24}$. The anodes of back-to-back coupled diodes $D_{23}$ and $D_{24}$ are coupled to junction $J_9$ which is in turn coupled to Vcc through resistor $R_{28}$. The collector of transistor $Q_{12}$ is coupled to Vcc through resistor $R_{24}$. Transistor $Q_{13}$ has its emitter coupled to ground whereas its collector is coupled to a summing terminal.

In operation, the summing network 1 receives at its input terminals A, B, and $C_i$ voltage level signals indicative of bit representations that are to be added. For example, if a voltage $V_1$ is applied at terminal A substantially equal to voltage Vcc current of a value set by resistors $R_1$ and $R_2$ flows into the base of transistor $Q_1$ increasing the voltage output $V_S$ at output terminal $O_1$. If on the other hand the voltage $V_1$ at terminal A is substantially equal to zero volts, negligible current flows into the base of transistor $Q_1$, and the voltage $V_S$ at output terminal $O_1$ is not increased. The base bias of $Q_1$~0.4 above the emitter, is such that a voltage corresponding to logical zero at A causes A' to be at a lower voltage, causing $D_1$ to be reversed-biased so that no current flows through $R_2$. ($D_1$ is simply for input isolations at a "one" level.)

Voltage inputs $V_2$ and $V_3$ on terminals B and $C_i$ respectively operate in a similar manner.

The weighted voltage $V_S$ is applied to input terminals $I_1$, $I_2$, and $I_3$ respectively and hence to the base of each of transistors $Q_2$, $Q_5$, and $Q_8$ respectively. As has been previously noted the biasing elements of transistors $Q_4$, $Q_7$, and $Q_{10}$, are selected to apply a reference voltage $V_R$ to transistor $Q_3$, $2V_R$ to the base of transistor $Q_6$, and $3V_R$ to the base of transistor $Q_9$ respectively. A comparison is made in each of differential comparators 2, 3, and 4 between the reference voltage of each comparator respectively and the weighted voltages $V_S$. If for example, $V_S$ is substantially equal to zero transistor $Q_2$ is off whereas transistor $Q_3$ is on. This is true because a substantially zero voltage on the base of transistor $Q_2$ and the more positive voltage supplied by $Vcc$ to the collector of transistor $Q_2$ back biases the base-collector circuit of transistor $Q_2$ and it sees a high resistance, whereas with a voltage $V_R$ applied to the base of NPN transistor $Q_3$ the base collector circuit is back biased to the lesser degree and has a lower resistance to current flow. As $V_S$ increases so that it becomes slightly greater than $V_R$, transistor $Q_2$ turns on cutting off transistor $Q_3$, by increasing current into the base of transistor $Q_2$, thus drawing more collector current at transistor $Q_2$ and decreasing collector to emitter voltage (VCE) of transistor $Q_2$. Thus the voltage at E increases as transistor $Q_2$ pulls more current through it, which in turn reduces VCE of transistor $Q_3$. Since the current into the base of transistor $Q_3$ (by the voltage source circuit), driving VCE of transistor $Q_3$ lower causes transistor $Q_3$ to draw less current, effect of transistor $Q_3$ is increased as transistor $Q_2$ turns on. With transistor $Q_3$ off, the collector of transistor $Q_3$ is substantially at a voltage $Vcc$ and the collector of transistor $Q_2$ is substantially at a zero voltage which indicates that $V_S$ is greater than $V_R$. The operation of transistors $Q_5$ and $Q_6$ is similar to the above described operation, when comparing $V_S$ to $2V_R$; and also the operation of transistors $Q_8$ and $Q_9$ are similar when comparing $V_S$ to $3V_R$.

With the open collector of transistor $Q_{14}$ coupled to an appropriate "Pull-up" resistor (not shown, since it is provided by the input circuit) transistor $Q_{14}$ will be turned off whenever $V_S$ is greater than $2V_R$ since under these conditions transistor $Q_5$ will be turned on, lowering the potential at junction $J_2$ which in turn lowers the back-bias and hence the resistance of the collector-base circuit of transistor $Q_{14}$.

Transistor $Q_{11}$ will turn on whenever both transistors $Q_3$ and $Q_5$ are off, which is a condition which corresponds to $V_S$ being greater than $V_R$. With $V_S$ greater than $V_R$ transistor $Q_2$ is on whereas with $2V_R$ greater than $V_S$ transistor $Q_5$ is off. With transistor $V_2$ on, and $Q_3$ off, junction $J_1$ will be substantially at $Vcc$ which reverse biases diode $D_{20}$; and with transistor $Q_5$ off and transistor $Q_6$ on, the junction $J_2$ will be substantially at the voltage $Vcc$ and hence diode $D_{22}$ is also back biased; however diode $D_{21}$ having its anode coupled to Vcc through resistor $R_{26}$ is forward biased which in turn applies a forward bias to the base of transistor $Q_{11}$ thus turning transistor $Q_{11}$ on. Similarly, transistor $Q_{12}$ turns on when transistor $Q_9$ is off, which condition corresponds to $V_S$ being greater than $3V_R$. By connecting the emitters of transistors $Q_{11}$ and $Q_{12}$ and in turn coupling them to the base of transistor $Q_{13}$, transistor $Q_{13}$ turns on when either transistor $Q_{11}$ or $Q_{12}$ is on. With $Q_{11}$ on, the collector emitter voltage, $Vcc_{11}$ is small enough, and $R_{27}$ so chosen, that sufficient base current is provided to $Q_{13}$ through the path $Vcc$–$R_{27}$ –$Q_{11}$–$_{30}$ to turn $Q_{13}$ on. (Note that transistor $Q_{13}$ also requires a pull-up resistor as previously described with transistor $Q_{14}$.) The circuit of $Q_{12}$ is identical in operation. Since $J_7$ is common, then sufficient turn-on base current is supplied to $Q_{13}$ if $Q_{11}$, $Q_{12}$ or both are on.

Having shown and described a preferred embodiment of the invention, those skilled in the art will realize that many variations and modifications can be made to produce the described invention and still be within the spirit and scope of the claimed invention.

What is claimed is:

1. A binary adder comprising:

a. input means for applying logic level electric signals;

b. summing means coupled to and responsive to said input means for providing a weighted analog voltage signal representative of the state of each voltage logic level input;

c. reference means for providing predetermined reference voltage levels;

d. comparison means coupled to said summing means and to said reference means for comparing the reference voltage levels with the weighted analog voltage signal; and e. output means coupled to said comparison means for providing output logic level signals dependent on the result of the comparison of the reference voltage levels with the weighted analog voltage signal and wherein said output means include NOR gate means for providing a single-bit sum signal when there are an odd number of high logic level electric signals at said input means, and a single carry-out signal when two or more input logic level electronic signals are high.

2. A binary adder comprising:

a. at least three input means for introducing logic level electric signals representative of binary ones or zeroes, a "one" being represented by a high electric logic level signal and a "zero" by a low electric logic level signal;

b. operational amplifier means responsive to said input means for providing a weighted analog voltage signal $V_s$ representative of the state of each logic level input signal at each of said input means;

c. at least three reference voltage means for providing three predetermined reference voltage levels $V_R$, $2V_R$ and $3V_R$ respectively;

d. at least three comparison means each coupled to said operational amplifier means and each coupled to a respective one of said reference voltage means for comparing the weighted analog voltage signal $V_s$ with each of the reference voltage levels $V_R$, $2V_R$ and $3V_R$; and e. output means coupled to each of said comparison means for providing output logic level signals dependent on the result of the comparison of the weighted analog voltage signal $V_s$ with the reference voltage level signals $V_R$, $2V_R$ and $3V_R$.

3. A binary adder as recited in claim 2 including first NOR gate means coupled to a predetermined two of said comparison means for providing a low output signal when there are an odd number of "ones" applied to said input means.

4. A binary adder as recited in claim 3 further including second NOR gate means coupled to said first NOR gate means and to a predetermined one of said comparison means for providing a single bit sum signal when there are an odd number of "ones" applied to said input means.

5. A binary adder as recited in claim 2 wherein the logic level inputs when present are each of equal amplitude $V_L$.

6. A binary adder as recited in claim 5 wherein the three predetermined reference voltage levels are chosen such that:

a. $V_l > V_R > 0$ b. $2V_L > 2V_R > V_L$ and c. $3V_L > 3V_R > 2V_L$.

7. A binary adder as recited in claim 6 wherein a single bit sum signal is provided when:

a. $2V_R > V_s > V_R$ or b. $V_s > 3V_R$.

8. A binary adder as recited in claim 7 wherein a carry-out signal is provided when:

a. $V_s > 2V_R$.

* * * * *